United States Patent
Kimoto (10) Patent No.: US 9,347,403 B2
(45) Date of Patent: May 24, 2016

(54) FUEL TANK

(75) Inventor: Junya Kimoto, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 273 days.

(21) Appl. No.: 13/885,994

(22) PCT Filed: Nov. 17, 2010

(86) PCT No.: PCT/JP2010/070453
§ 371 (c)(1),
(2), (4) Date: May 16, 2013

(87) PCT Pub. No.: WO2012/066646
PCT Pub. Date: May 24, 2012

(65) Prior Publication Data
US 2013/0233286 A1    Sep. 12, 2013

(51) Int. Cl.
*F02M 37/20*    (2006.01)
*F17D 1/00*    (2006.01)
*F02M 25/08*    (2006.01)
(Continued)

(52) U.S. Cl.
CPC ...... *F02M 25/0854* (2013.01); *B60K 15/03177* (2013.01); *B60K 15/03504* (2013.01); *F02M 25/089* (2013.01); *B60K 2015/03467* (2013.01); *B60K 2015/03514* (2013.01)

(58) Field of Classification Search
CPC ... F02M 25/0809; F02M 25/08; F02M 37/20; F02M 37/00; F02M 25/0836; F02M 25/089; F02M 25/0854; B60K 15/03; B60K 15/03504; B60K 15/077

USPC .......................... 123/516, 518–520
See application file for complete search history.

(56) References Cited

U.S. PATENT DOCUMENTS 6,273,070 B1 * 8/2001 Arnal et al. .................. 123/519
6,367,458 B1 * 4/2002 Furusho ............ F02M 25/0809
                                                123/198 D
(Continued)

FOREIGN PATENT DOCUMENTS

CA    2539379 A1    9/2006
DE    60214426 T2    5/2007
(Continued)

OTHER PUBLICATIONS

PCT/JP2010/070453 International Search Report dated Feb. 22, 2011 (2 p.).
(Continued)

*Primary Examiner* — Lindsay Low
*Assistant Examiner* — Syed O Hasan
(74) *Attorney, Agent, or Firm* — Conley Rose, P.C.

(57) ABSTRACT

The present invention enables a canister in a fuel tank with the canister to be separately subjected to a product inspection and enables the canister to be replaced.
The fuel tank according to the present invention includes: a tank body (10*m*) configured by joining a plurality of shells (12) and (14) to each other; and a canister (20) configured to enable absorption of fuel vapor generated in the tank body (10*m*), wherein, in one (12) of the shells that constitute the tank body (10*m*), and engaging portion (120) formed to be integral with the shell (12) is provided, and the canister (20) is configured to be mounted to the tank body (10*m*) by engaging an engaged portion (20*r*) of the canister (20) with the engaging portion (120).

9 Claims, 6 Drawing Sheets

(51) Int. Cl.
  *B60K 15/03* (2006.01)
  *B60K 15/035* (2006.01)

(56) References Cited

U.S. PATENT DOCUMENTS

| | | | |
|---|---|---|---|
| 7,681,557 B2 * | 3/2010 | Kim | B60K 15/03504 123/519 |
| 2005/0139197 A1 * | 6/2005 | Ohhashi | F02D 41/266 123/520 |
| 2005/0205156 A1 | 9/2005 | Ganachaud et al. | |
| 2005/0217735 A1 | 10/2005 | Firtion et al. | |
| 2005/0284450 A1 | 12/2005 | Mills | |
| 2006/0207575 A1 | 9/2006 | Mills | |

FOREIGN PATENT DOCUMENTS

| | | |
|---|---|---|
| JP | 2004019507 A | 1/2004 |
| JP | 2004100513 A | 4/2004 |
| JP | 2005537980 A | 12/2005 |
| JP | 2006103457 A | 4/2006 |
| JP | 2006258100 A | 9/2006 |
| JP | 2008168767 A | 7/2008 |
| WO | 2004024487 A1 | 3/2004 |

OTHER PUBLICATIONS

German Patent Application No. 112010006001.0 Office Action dated Oct. 8, 2015 (7 pages).

* cited by examiner

FUEL TANK

TECHNICAL FIELD

The present invention relates to a fuel tank which includes a task body configured by joining a plurality of shells to each other, and a canister configured to enable adsorption of fuel vapor generated is the tank body.

BACKGROUND ART

A technique related to the fuel tank described above is disclosed in JP-A-2008-168767.

The tank body of the fuel tank is constituted by an upper shell and a lower shell, which are made of an injection-molded resin. The container body of the canister is formed to be integrated with the inner wall surface of the upper shell when the upper shell is injection-molded. The container body of the canister is filled with an adsorbent such as activated carbon, and an opening of the container body is closed by a cover material. Next, a flange portion of the upper shell and a flange portion of the lower shell are joined to each other, thereby completing the tank body.

In the fuel tank described above, when the upper shell included in the tank body is injection-molded, the container body of the canister is formed to be integrated with the inner wall surface of the upper shell. Therefore, even in case where only the canister is to be detached and attached afterward, detaching and attaching of the canister is not possible. Furthermore, it is difficult for the canister to be separately subjected to a product inspection. Therefore, there has been a need for improved fuel tanks.

BRIEF SUMMARY OF THE INVENTION

In a first aspect of this disclosure, a fuel tank includes: a tank body configured by joining a plurality of shells to each other; and a canister configured to enable adsorption of fuel vapor generated in the tank body, wherein, in one of the shells that constitute the tank body, an engaging portion formed to be integrated with the shell is provided, and the canister is configured to be mounted to the tank body by engaging an engaged portion of the canister with the engaging portion.

According to this aspect, by engaging the engaged portion of the canister with the engaging portion of the shell, the canister is mounted to the shell. In addition, by joining the shell to the other shell, the tank body of the fuel tank is formed.

In this manner, since the canister is configured to be mounted to the shell (the tank body) by the action of engagement between the engaged portion and the engaging portion, the canister is able to be separately subjected to a product inspection before being mounted to the shell. In addition, the canister is also detachable by disengaging the engaged portion of the canister from the engaging portion of the shell.

According to a second aspect of this disclosure, a plurality of the engaging portions are formed on an inner wall surface of the shell, and the canister is configured to be mounted to an inside of the tank body.

In this manner, since the canister is mounted to the inside of the tank body, even in a case where the fuel vapor permeates the canister, the fuel vapor does not leak out to the atmosphere. Furthermore, compared to a case where the canister is mounted to the outside of the tank body, the shape of the fuel tank is not complex.

According to a third aspect of this disclosure, a vapor passage which guides the fuel vapor generated in the tank body to the canister in the tank body, and an inflow regulating valve which is provided in the vapor passage and prevents liquid fuel in the tank body from flowing into the canister are integrated with the canister.

In this manner, since the vapor passage and the inflow regulating valve are integrated with the canister and are mounted to the inside of the tank body, the fuel vapor that leaks out from the vapor passage and the like does not leak out to the atmosphere.

According to a fourth aspect of this disclosure, when the engaged portion of the canister is engaged with the engaging portion formed on the inner wall surface of the shell, an atmosphere port and a purge port of the canister are configured to be respectively inserted into an atmosphere port connection portion and a purge port connection portion which are formed in the shell so as to be connected.

Therefore, an operation of connecting the atmosphere port connection portion and the purge port connection portion of the shell to the atmosphere port and the purge port of the canister is facilitated.

According to a fifth aspect of this disclosure, the plurality of shells include an upper shell that constitutes an upper portion of the tank body and a lower shell that forms a lower portion of the tank body, and the canister is mounted to an inside of the upper shell at a position higher than an upper limit position of a liquid level of the fuel.

Accordingly, a space where the fuel vapor is accumulated in the tank body is reduced by the volume of the canister, and the amount of the fuel vapor generated is reduced. In addition, since the canister is housed in the tank body, the amount of fuel stored is not reduced.

According to this disclosure, the canister in the fuel tank with the canister is able to be separately subjected to a product inspection, and the canister is detachable and attachable.

DESCRIPTION OF EMBODIMENTS

First Embodiment

Summary of Fuel Tank 10

Hereinafter, a fuel tank according to a first embodiment of the present invention will be described with respect to FIGS.

1 to 8. The fuel tank according to this embodiment is a fuel tank with a canister to be used in a vehicle.

Figure 2:
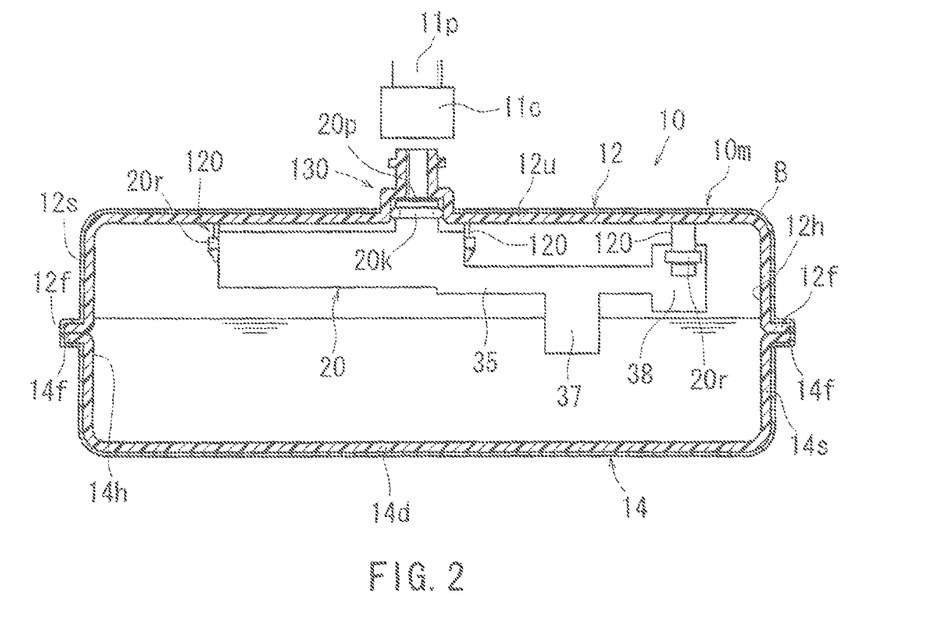
FIG. 2 is a schematic longitudinal cross-sectional view of the fuel tank.

The fuel tank 10 includes a tank body 10m constituted by an upper shell 12 and a lower shell 14 as illustrated in FIG. 2 and the like. The upper shell 12 and the lower shell 14 are resin injection-molded products, and the surfaces thereof are covered with a barrier layer B having fuel permeation resistance. Here, as a resin that is a body material of the upper shell 12 and the lower shell 14, for example, high-density polyethylene (HDPE) is used, and as a material of the barrier layer B, and ethylene vinyl alcohol copolymer (EVOH) is used.

Figure 4A:
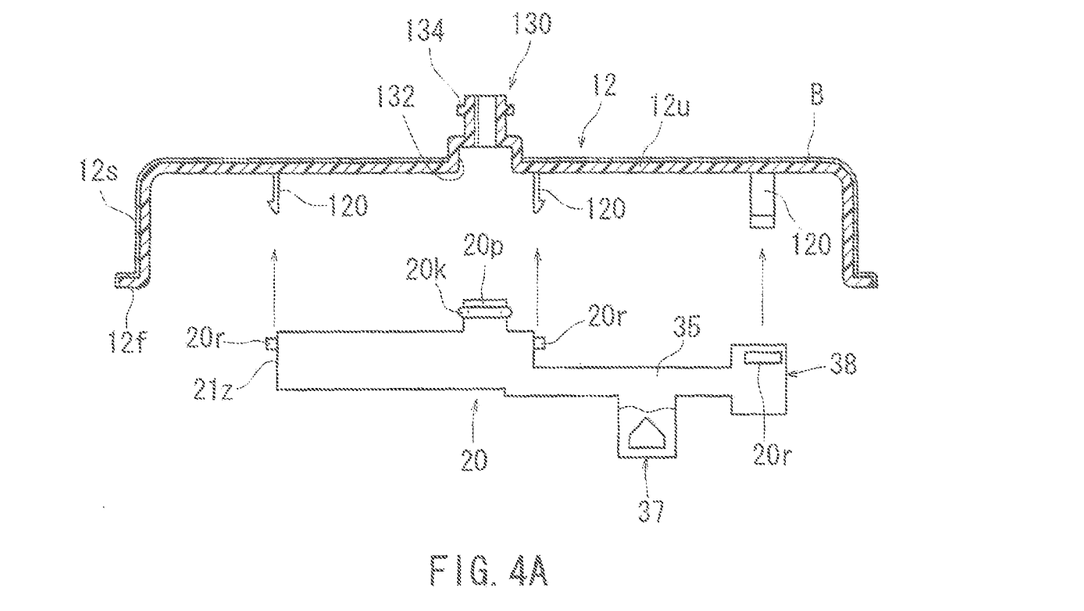
FIG. 4A is a longitudinal cross-sectional view illustrating a canister mounting structure in a fuel tank.
Figure 4B:
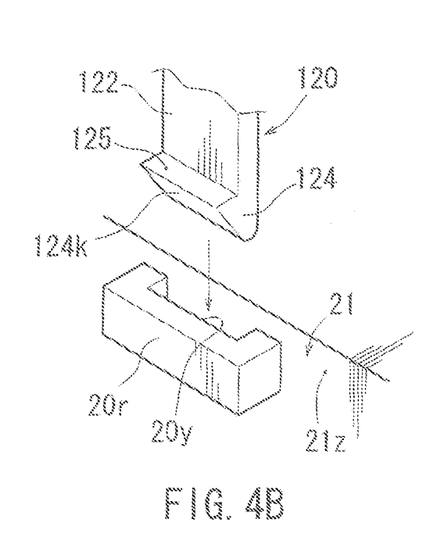
FIG. 4B is a schematic diagram illustrating a claw portion and a claw receiving portion.

The upper shell 12 is formed by an upper plate portion 12u and a side plate portion 12s in a square container shape in which the lower side thereof is opened, and a flange portion 12f is formed at the peripheral edge of a lower side opening 12h. In addition, at predetermined positions of the rear surface (lower surface) of the upper plate portion 12u of the upper shell 12, as illustrated in FIG. 4A, a plurality of the claw portions 120 are formed to protrude downward in order to mount the canister 20 to the inner side upper portion of the upper shell 12. The claw portion 120 is formed to be integrated with the upper shell 12, and as illustrated in FIG. 4B, is constituted by a flat portion 122 and a wedge-shaped hook portion 124 formed at the tip of the flat plate portion 122. The flat plate portion 122 of the claw portion 120 is configured to be elastically deformable in the thickness direction, and a stepped portion 125 is formed between the flat plate portion 122 and the hook portion 124. As the plurality of claw portions 120 of the upper shell 12 are engaged with a plurality of claw receiving portions 20r of the canister 20 as described later, the canister 20 is mounted to the upper shell 12.

In addition, in the upper plate portion 12u of the upper shell 12, a purge port connection portion 130 to which a purge port 20p of the canister 20 is connected from the inside and an atmosphere port connecting portion 140 to which an atmosphere port 20e (see FIG. 1) of the canister 20 is similarly connected from the inside are formed. As illustrated in FIG. 4, the purge port connection portion 130 is constituted by a large-diameter port receiving portion 132 into which the purge port 20p of the canister 20 is inserted from below to be connected, and a small-diameter connector portion 134 to which a connector 11c of a purge pipe 11p that communicates with an intake pipe W (see FIG. 1) of an internal combustion engine E is connected. The atmosphere port connection portion 140 has the same configuration as that of the purge port connection portion 130, and is constituted by a port receiving portion (not shown) into which the atmosphere port 20e of the canister 20 is inserted from below to be connected and a connector portion (not shown) to which an atmosphere opening pipe 11e (see FIG. 1) is connected.

The purge port connection portion 130 and the atmosphere port connection portion 140 of the upper shell 12 are formed at positions where the purge port 20p and the atmosphere port 20e of the canister 20 are inserted to be connected when the claw portions 120 of the upper shell 12 are engaged with the claw receiving portions 20r of the canister 20.

As illustrated in FIG. 2, the lower shell 14 is formed by a bottom plate portion 14d and a side plate portion 14s in a square container shape in which the upper side thereof is opened, and a flange portion 14f is formed at the peripheral edge of an upper side opening 14h. The flange portion 14f of the lower shell 14 and the flange portion 12f of the upper shell 12 are joined to each other, thereby forming the tank body 10m.

<Canister 20>

Figure 1:
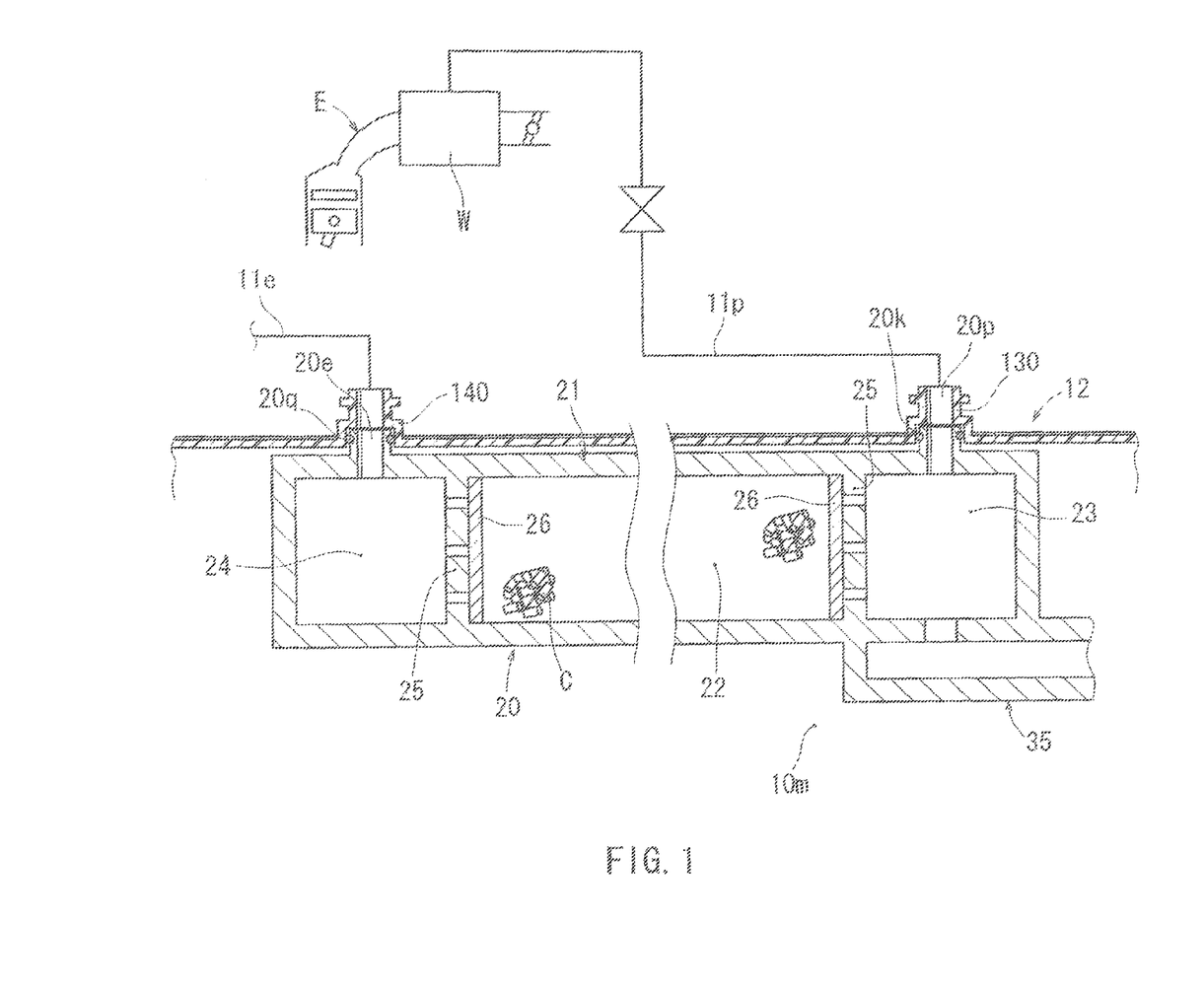
FIG. 1 is a schematic diagram illustrating the configuration of a canister in a fuel tank according to a first embodiment of the present invention.

As illustrated in FIG. 1, the canister 20 is configured to enable absorption of fuel vapor which is generated in the tank body 10m and enable the adsorbed fuel vapor to be supplied to the intake pipe W of the engine E. As illustrated in the schematic diagram of FIG. 1, the canister 20 includes a sealed type housing 21, and a main chamber 22, a first sub-chamber 23, and a second sub-chamber 24 are formed inside the housing 21. The main chamber 22 is a chamber filled with an adsorbent C made of granular activated carbon or the like, and the first sub-chamber 23 and the second sub-chamber 24 are provided on both sides of the main chamber 22. The main chamber 22, the first sub-chamber 23, and the second sub-chamber 24 are partitioned by partition walls 25 including vents, and the main chamber side surfaces of the partition walls 25 are covered with filters 26 made of non-woven fabric or the like. Accordingly, the adsorbent C is prevented from being dropped out through the vents of the partition walls 25.

The purge port 20p is formed in the upper portion of the first sub-chamber 23, and a vapor pipe 35 is connected to the lower portion of the first sub-chamber 23. In addition, the atmosphere port 20e is formed in the upper portion of the second sub-chamber 24. As illustrated in FIG. 4, the purge port 20p is configured to the inserted in the axial direction (from below) to be connected to the port receiving portion 132 of the purge port connection portion 130 formed in the upper shell 12, and an O-ring 20k which is a seal material is fitted to the outer peripheral surface of the purge port 20p. In addition, the atmosphere port 20e is configured to be inserted in the axial direction (from below) to be connected to the port receiving portion (not shown) of the atmosphere port connection portion 140 formed in the upper shell 12, and an O-ring 20q (see FIG. 1) which is a seal material is fitted to the outer peripheral surface of the atmosphere port 20e.

Figure 3:
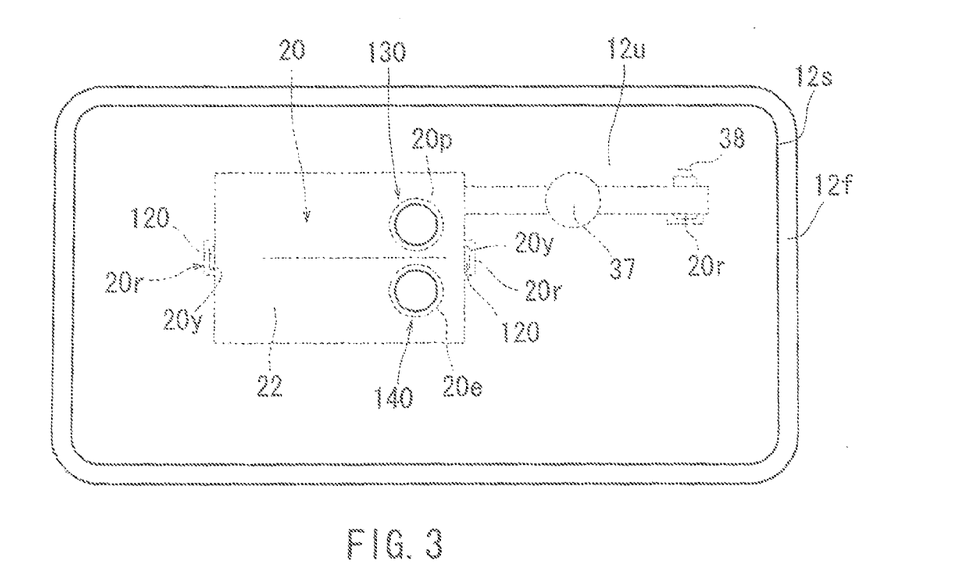
FIG. 3 is a schematic plan view of the fuel tank.

Here, in FIG. 1, in order to intelligibly show the actions of the canister 20, the main chamber 22 is expressed in a linear shape. However, the actual, main chamber 22 is formed in a substantially U-shape on the plane as illustrated in FIG. 3, and the purge port 20p and the atmosphere port 20e are adjacent to each other.

The vapor pipe 35 is a pipe that guides the fuel vapor generated in the tank body 10m to the canister 20, and as illustrated in FIG. 2, a fill-up regulating valve 37 is provided at an intermediate position of the vapor pipe 35. In addition, a cut-off valve 38 is provided at the tip position of the vapor pipe 35.

The fill-up regulating valve 37 is a valve which prevents the fuel in the tank body 10m from flowing into the vapor pipe 35 to supress a rise in a fuel liquid level in the tank body 10m. That is, the fuel liquid level in the tank body 10m does not rise to exceed the fill-up regulating valve 37. As illustrated in the schematic diagram of FIG. 4C, the fill-up regulating valve 37 includes a valve housing 37c and a float type valve body 37f housed in the valve housing 37c. In the valve housing 37c, a tank side opening 37e which communicates with the inside of the tank body 10m is formed at the bottom portion, and a pipe side opening 37p which communicates with the vapor pipe 35 is formed at the ceiling portion. In addition, the valve body 37f is configured in be able to close the pipe side opening 37p of the valve housing 37c in a state where the float type valve body 37f floats on the fuel.

Figure 4C:
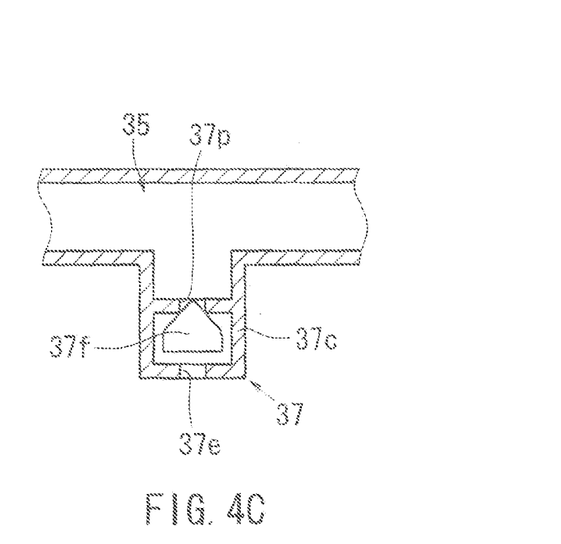
FIG. 4C is a schematic diagram illustrating an action of a fill-up regulating valve.

Therefore, in the case where the fuel liquid level in the fuel tank 10 is lower than the fill-up regulating valve 37, the float type valve body 37f is placed on the bottom portion (lower limit position) of the valve housing 37c such that the pipe side opening 37p of the fill-up regulating valve 37 is open. Accordingly, the fuel vapor in the tank body 10m may be guided to the canister 20 from the fill-up regulating valve 37 and the vapor pipe 35.

In addition, in a case where the fuel liquid level in the fuel tank 10 is at the position of the fill-up regulating valve 37, that is, in a case where the fuel flows into the valve housing 37c of the fill-up regulating valve 37, the valve body 37f floats in the valve housing 37c, and thus the pipe side opening 37p is closed by the valve body 37f. Accordingly, the fuel in the tank body 10m does not flow into the vapor pipe 35.

The cut-off valve 38 is positioned at a position higher than the fill-up regulating valve 37 and is typically held in an open state. However, the cut-off valve 38 is configured to be closed during an overturning of a vehicle or the like so as to prevent the fuel in the tank body 10m from flowing into the vapor pipe 35 at this time.

The vapor pipe 35, the fill-up regulating valve 37, and the cut-off valve 38 are integrated with the canister 20, and the height position of the canister 20 is set to a position higher than the vapor pipe 35. Therefore, the fuel liquid level in the tank 10m does not reach the position of the canister 20 even when the fuel tank is filled up.

That is, the fill-up regulating valve 37 and the cut-off valve 38 correspond to inflow prevention valves of the present invention.

On the side surface of the housing 21 of the canister 20, the plurality of claw receiving portions 20r are formed in the peripheral direction of the housing 21. As illustrated in FIGS. 4A and 4B, the claw receiving portions 20r are positioned at position corresponding to the respective claw portions 120 on the rear surface of the upper shell 12, and are formed in a flat gate shape. As illustrated in FIG. 4B, in a state where the claw receiving portions 20r are transversely held, both ends of the claw receiving portion 20r are joined to a side surface 21z of the housing 21 of the canister 20. Accordingly, a slit-shaped opening 20y through which the claw portion 120 of the upper shell 12 passes is formed between the claw receiving portion 20r and the side surface 21z of the housing 21. That is, a length dimension of the slit-shaped opening 20y is set to be approximately the same as width dimensions of the flat plate portion 122 of the claw portion 120 and the hook portion 124, and a width dimension of the slit-shaped opening 20y is set to be approximately the same as a thickness dimension of the stepped portion 125 of the claw portion 120.

When the claw portion 120 of the upper shell 12 is inserted into the slit-shaped opening 20y of the claw receiving portion 20r of the canister 20, and inclined surface 124k of the hook portion 124 of the claw portion 120 abuts on the claw receiving portion 20r and slides. Accordingly, the hook portion 124 of the claw portion 120 is displaced from the position of the claw receiving portion 20r toward the side surface 21z of the housing 21, and the flat plate portion 122 of the claw portion 120 is elastically deformed toward the side surface 21z of the housing 21. In addition, in a stage in which the hook portion 124 of the claw portion 120 passes through the claw receiving portion 20r, the flat plate portion 122 of the claw portion 120 returns to its original state (widens outward) by the elastic force, and the stepped portion 125 of the claw portion 120 is caught on the claw receiving portion 20r. In this state, engagement between the claw portion 120 of the upper shell 12 are respectively engaged in the plurality of claw receiving portions 20r of the canister 20, the purge port 20p and the atmosphere port 20e of the canister 20 are respectively inserted into the purge port connection portion 130 and the atmosphere port connection portion 140 of the upper shell 12 to be connected, thereby completing mounting of the canister 20.

That is, the claw portion 120 corresponds to an engaging portion of the present invention, and the claw receiving portion 20r corresponds to an engaged portion of the present invention.

<Summary Method of Manufacturing Fuel Tank 10>

First, the canister 20 which has been subjected to a product inspection is mounted to the upper shell 12. When the canister 20 is mounted to the upper shell 12, the purge port 20p and the atmosphere port 20e of the canister 20 are respectively aligned with the purge port connection portion 130 and the atmosphere port connection portion 140 of the upper shell 12. Furthermore, the plurality of claw receiving portions 20r of the canister 20 are aligned with the plurality of claw portions 120 of the upper shell 12. Next, the claw portions 120 of the upper shell 12 are respectively inserted into the slit-shaped openings 20y provided in the claw receiving portions 20r of the canister 20, and the claw receiving portions 120 of the the upper shell 12 are respectively engaged with the claw receiving portions 20r of the canister 20. Here, insertion and connection of the purge port 20p and the atmosphere port connection port 140 of the upper shell 12 are simultaneously performed. In addition, in a state where the engagements between the claw portions 120 of the upper shell 12 and the claw receiving portions 20r of the canister 20 are completed, connections between the purge port 20p and the atmosphere port 20e of the canister 20 and the purge port connection portion 130 and the atmosphere port connection portion 140 of the upper shell 12 are completed, thereby ending mounting of the canister 20 to the upper shell 12.

Next, after a fuel pump or the like of which the illustration is omitted is mounted to the bottom portion of the lower shell 14, the flange portion 12f of the upper shell 12 and the flange portion 14f of the lower shell 14 are heated such that the flange portion 12f of the upper shell 12 and the flange portion 14f of the lower shell 14 are heat-infused to each other. Accordingly, the fuel tank is completed.

<Actions of the Fuel Tank>

Next, the actions of the fuel tank 10 according to the embodiment will be simply described.

In a stopped state of engine E, when the internal pressure of the fuel tank 10 is increased due to a temperature rise, gas (fuel+air) in the fuel tank 10 flows into the canister 20 through the fill-up regulating valve 37 and the vapor pipe 35. The fuel vapor that flows into the canister 20 diffuses into the main chamber 22 from the first sub-chamber 23 illustrated in FIG. 1, and is adsorbed to the adsorbent C in the main chamber 22. In addition, air from which the fuel vapor is removed diffuses to the outside from the second sub-chamber 24 and the atmosphere port 20e (the atmosphere port connection portion 140). In addition, in the stopped state of the engine E, when the internal pressure of the fuel tank 10 is reduced sue to a temporary drop (becomes a negative pressure), the outside air is introduced into the canister 20 from the atmosphere port 20e or the like and is supplied into the fuel tank 10.

In addition, during fueling, gas, (fuel vapor+air) in the fuel tank 10 flows into the canister 20 through the fill-up regulating valve 37 and the vapor pipe 35. The fuel vapor that flows into the canister 20 flows into the main chamber 22. In addition, air from which the fuel vapor is removed diffuses to the outside from the second sub-chamber 24 and the atmosphere port 20e (the atmosphere port connection portion 140).

In addition, when the inside of the intake pipe W becomes a negative pressure due to driving of the engine E, the inside of the canister 20 becomes a negative pressure via the purge pipe 11p and the purge port connection portion 130 (the purge port 20p). Accordingly, after the air flows into the canister 20 from the atmosphere port 20e (the atmosphere port connection portion 140) and the air passes through the main chamber 22, the air is supplied into the intake pipe W of the engine E via the purge port 20p and the purge pipe 11p. In addition, the fuel vapor that is adsorbed to the adsorbent C when the air passes through the main chamber 22 is purged and desorbed from the adsorbent C, and the fuel vapor that is desorbed is supplied into the intake pipe W of the engine E along with the air.

<Advantages of Fuel Tank 10 According to This Embodiment>

According to the fuel tank 10 of this embodiment, as the claw receiving portions 20r of the canister 20 are engaged with the claw portions 120 of the upper shell 12, the canister 20 is mounted on the upper shell 12. The upper shell 12 is then joined with the lower shell 14, thereby forming the fuel tank 10.

In this manner, since the canister 20 is configured to be mounted to the upper shell 12 by the action of engagement between the claw receiving portions 20r and the claw portions 120, the canister 20 is able to be separately subjected to a product inspection before being mounted to the upper shell 12. In addition, the canister 20 is also detachable by disengaging the claw receiving portions 20r of the canister 20 from the claw portions 120 of the upper shell 12.

In addition, since the canister 20 is mounted to the inside of the tank body 10m, even in a case where the fuel vapor permeates the canister 20, the fuel vapor does not leak out to the atmosphere. Furthermore, compared to a case where the canister 20 is mounted to the outside of the tank body 10m, the shape of the fuel tank 10 is not complex.

In addition, since the vapor pipe 35 and inflow regulating valves (the fill-up regulating valve 37 and the cut-off valve 38) are integrated with the canister 20 and are mounted to the inside of the tank body 10m, the fuel vapor that leaks out from the vapor pipe 35 and the like does not leak out to the atmosphere.

In addition, the atmosphere port 20e and the purge port 20p of the canister 20 are configured to be able to be inserted into the atmosphere port connection portion 140 and the purge port connection portion 130 formed in the upper shell 12 so as to be connected thereto when the claw receiving portions 20r of the canister 20 are engaged with the claw portions 120 formed on the inner wall surface of the upper shell 12. Therefore, connections between the atmosphere port 20e and the purge port 20p of the upper shell 12 and the atmosphere port 20e and the purge port 20p of the canister 20 are facilitated.

In addition, since the canister 20 is mounted to the inside of the upper shell 12 at the position higher than the upper limit position of the fuel liquid level, a space where the fuel vapor is accumulated in the tank body 10m may be reduced by the volume of the canister 20, and the amount of the fuel vapor generated may be reduced. In addition, since the canister 20 is housed in a space part inside the tank body 10m, the amount of stored fuel is not reduced.

Modification Example

Here, the present invention is not limited to the above-described embodiment, and may be modified in a scope that does not depart from the gist of the present invention. For example, in this embodiment, an example in which the fill-up regulating valve 37 is provided at the intermediate position of the vapor pipe 35 and the cut-off valve 38 is provided at the tip position of the vapor pipe 35, the fuel vapor in the tank body 10m is introduced into the vapor pipe 35 via the fill-up regulating valve 37 or the cut-off valve 38 and is guided into the first sub-chamber 23 of the canister 20 by the vapor pipe 35 is illustrated.

Figure 5:
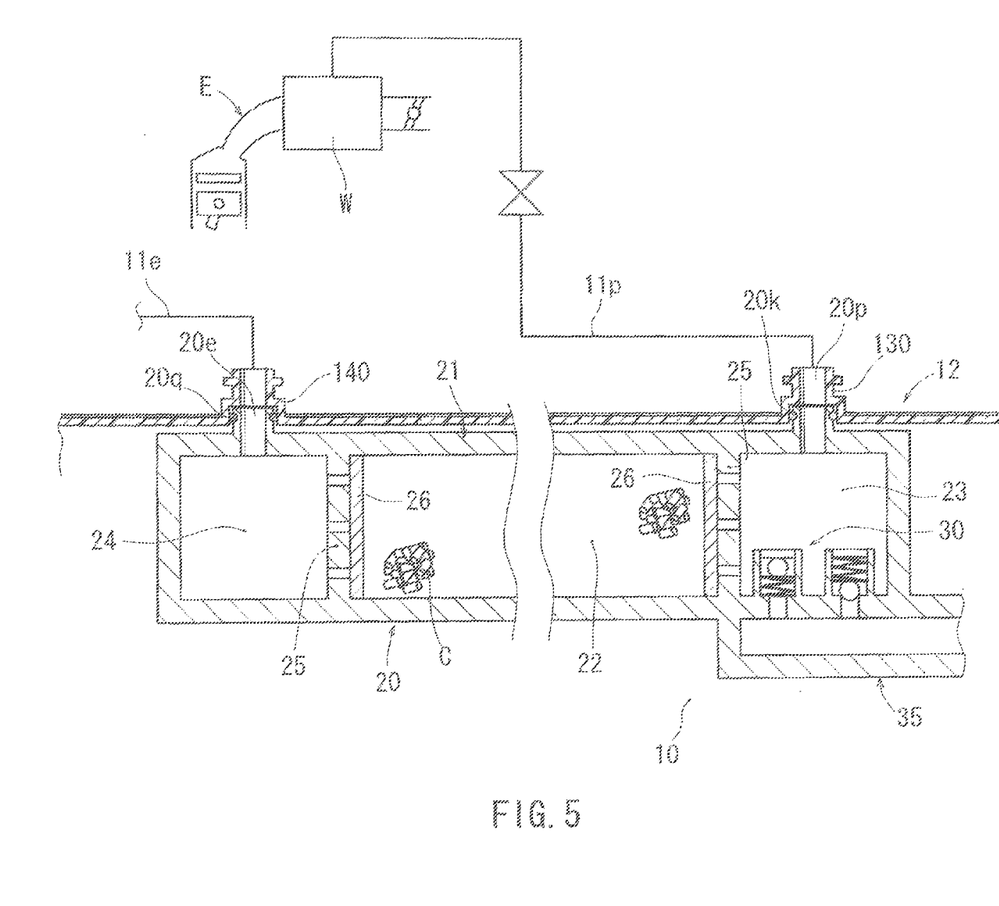
FIG. 5 is a schematic diagram illustrating the configuration of a canister in a fuel tank according to a modification example.

However, as illustrated in FIG. 5, a configuration in which the fill-up regulating valve 37 is omitted and a bidirectional check valve 30 is provided in an inlet portion of the first sub-chamber 23 of the canister 20 is possible. Here, the bidirectional check valve 30 is a protection valve that prevents damage of tank body 10m and is typically held in a close state during fueling. Accordingly, during fueling, the air or the like in the tank body 10m is not introduced to the canister 20 and is discharged to the outside by a breather line of which the illustration is omitted.

Figure 6:
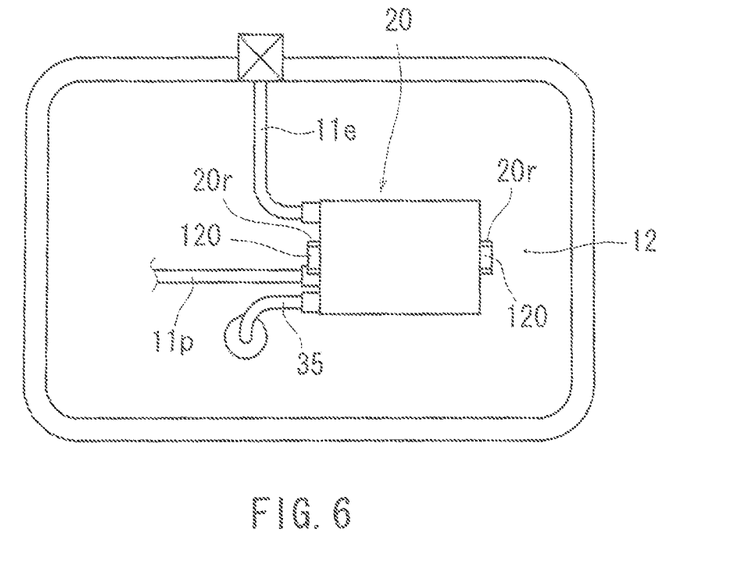
FIG. 6 is a plan view illustrating the fuel tank according to the modification example.
Figure 7:
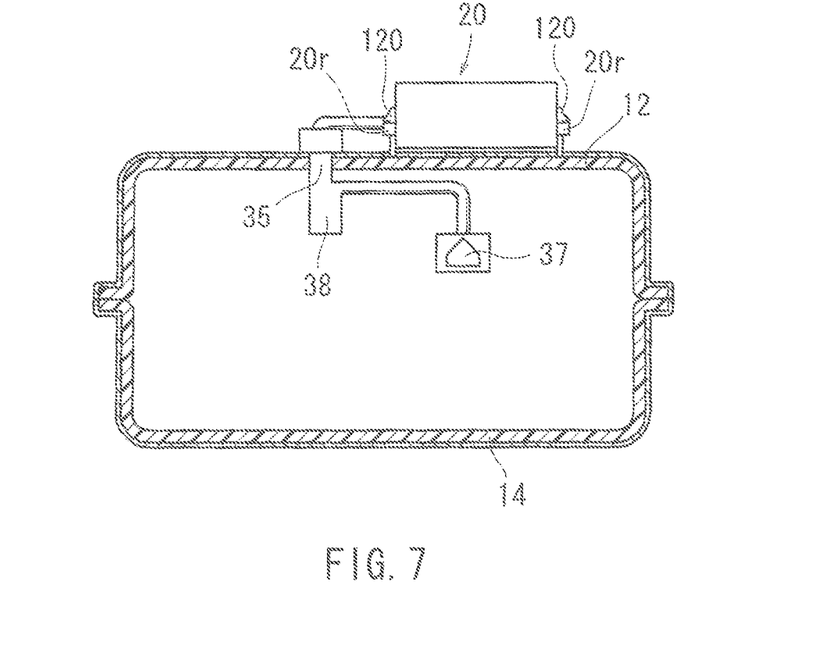
FIG. 7 is a longitudinal cross-sectional view illustrating the fuel tank according to the modification example.
Figure 8:
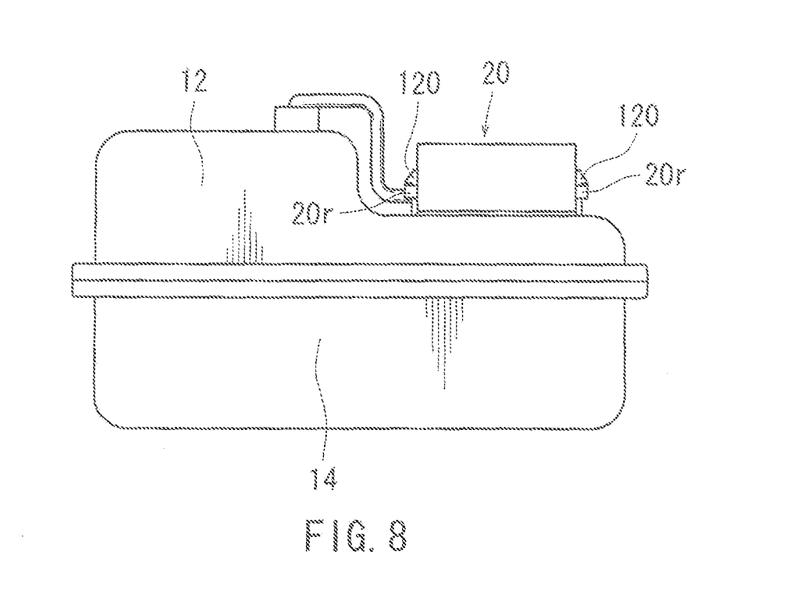
FIG. 8 is a side view illustrating the fuel tank according to the modification example.

In addition, in this embodiment, an example in which the vapor pipe 35, the fill-up regulating valve 37, and the cut-off valve 38 are integrated with the canister 20 to be mounted to the inside of the upper shell 12 is illustrated. However, as illustrated in FIGS. 6 to 8, the vapor pipe 35, the fill-up regulating valve 37, and the cut-off valve 38 may be mounted to the inside of the upper shell 12 and the canister 20 may be mounted to the front side of the upper shell 12. Here, FIG. 6 is a plan view of the fuel tank according to the modification example, FIG. 7 is a longitudinal cross-sectional view of the fuel tank, and FIG. 8 is a side view of the fuel tank. At this time, due to the configuration in which the claw portion 120 formed on the front side of the upper shell 12 is engaged with the claw receiving portion 20r of the canister 20, the canister 20 may be mounted to the upper shell 12 with a single touch.

In addition, in this embodiment, the claw 120 is exemplified as the engaging portion of the upper shell 12 side, and the claw receiving portion 20r is exemplified as the engaged portion of the canister 20 side. However, the claw receiving portion 20r may also be formed on the upper shell 12 side as the engaging portion and the claw portion 120 may also be formed on the canister 20 side as the engaged portion.

Furthermore, the engaging and the engaged portions are not limited to the forms of this embodiment as long as any one or both are attachable and detachable through elastic deformation.

The invention claimed is:
1. A fuel tank comprising:
   a tank body comprising an upper shell joined to a lower shell, wherein the upper shell forms an upper portion of the tank body and the lower shell forms a lower portion of the tank body, and wherein the upper shell includes an upper part and a side part;
   a canister configured to enable adsorption of fuel vapor generated in the tank body; and
   an engaging portion including a wedge-shaped hook portion formed on and integrated with an inner wall surface of the upper part of the upper shell;
   wherein the canister includes an engaged portion including a slit-shaped opening;
   wherein the wedge-shaped hook portion of the engaging portion is configured to be inserted within the slit-shaped opening of the engaged portion along a first direction to mount the canister within the tank body;
   wherein, when the wedge-shaped hook portion of the engaging portion is inserted within the slit-shaped opening of the engaged portion along the first direction, an atmosphere port and a purge port of the canister are inserted into an atmosphere port connection portion and a purge port connection portion, respectively, along a second direction that is parallel to the first direction; and
   wherein the atmosphere port connection portion and the purge port connection portion are formed in the upper part of the upper shell.
2. The fuel tank according to claim 1,
   wherein a vapor passage which guides the fuel vapor generated in the tank body to the canister in the tank body, and an inflow regulating valve which is provided in the vapor passage and prevents liquid fuel in the tank body from flowing into the canister are integrated with the canister.

3. The fuel tank according to claim 1,
wherein the canister is configured to be mounted within the tank body at a position higher than an upper limit position of a liquid level of the fuel;
wherein the upper limit position of the liquid level corresponds to a state when the fuel tank is filled to full capacity.

4. The fuel tank of claim 1, wherein the atmosphere port connection portion and the purge port connection portion each include a receptacle that is configured to releasably receive the atmosphere port and the purge port, respectively, of the canister along the second direction.

5. The fuel tank of claim 1, wherein the first direction and the second direction are each oriented perpendicularly to the inner wall surface of the upper part of the upper shell.

6. A fuel tank comprising:
a tank body; and
a canister configured to enable adsorption of fuel vapor generated in the tank body;
an engaging portion including, a wedge-shaped hook portion formed on and integrated with an inner wall surface of the tank body;
wherein the canister includes an engaged portion including a slit-shaped opening; and
wherein the wedge-shaped hook portion of the engaging portion is configured to be inserted within the slit-shaped opening of the engaged portion along a first direction to mount the canister within the tank body;
wherein, when the wedge-shaped hook portion of the engaging portion is inserted within the slit-shaped opening of the engaged portion along the first direction, an atmosphere port and a purge port of the canister are inserted into an atmosphere port connection portion and a purge port connection portion, respectively, along a second direction that is parallel to the first direction; and
wherein the atmosphere port connecting portion and the purge port connecting portion are formed in the tank body.

7. The fuel tank of claim 6, wherein the wedge-shaped hook of the engaging portion is formed on and integrated with an upper inner wall surface of the tank body.

8. The fuel tank of claim 6, wherein the atmosphere port connection portion and the purge port connection portion each include a receptacle that is configured to releasably receive the atmosphere port and the purge port, respectively, of the canister along the second direction.

9. The fuel tank of claim 6, wherein the first direction and the second direction are each oriented perpendicularly to the inner wall surface of the tank body.

* * * * *